United States Patent [19]
Fletcher et al.

[11] 3,927,324
[45] Dec. 16, 1975

[54] MICROMETEOROID VELOCITY AND TRAJECTORY ANALYZER

[76] Inventors: James C. Fletcher, Administrator of the National Aeronautics and Space Administration, with respect to an invention of Siegfried O. Auer, Lanham, Md.

[22] Filed: Aug. 30, 1974

[21] Appl. No.: 502,135

[52] U.S. Cl. ............... 250/336; 250/385; 250/489
[51] Int. Cl.² .......................................... G01T 1/16
[58] Field of Search .......... 250/336, 382, 385, 389, 250/395, 489

[56] References Cited
UNITED STATES PATENTS
3,612,858  10/1971  Parry ................................. 250/336

*Primary Examiner*—Davis L. Willis
*Attorney, Agent, or Firm*—Robert F. Kempf; Ronald F. Sandler; John R. Manning

[57] ABSTRACT

Movement of a charged particle through a region is detected by providing a detector including first, second and third spaced metal grids pervious to the particle and positioned so that the particle passes through them in sequence. The first and third grids are short-circuited to each other and to ground. A signal input terminal of a D.C. amplifier is connected in D.C. circuit with the second grid so that a voltage pulse induced in the second grid by the particle passing through the three grids results in an output pulse of the amplifier. A plurality of such detectors are arranged for enabling the position and velocity vectors of the charged particle to be detected in three mutually orthogonal axes, X, Y and Z. A first pair of detectors is spaced from each other in mutually parallel planes defined by the X and Y axes. A second pair of the detectors is spaced from each other in mutually parallel planes that intersect planes defined by the X and Y axes at a first acute angle to define variable times, in the directions of the Y and Z axes to the exclusion of the X axis, for the particle to pass through them relative to the time the particle passes through the first detector. A third pair of the detectors is spaced from each other in mutually parallel planes that intersect planes defined by the X and Y axes at a second angle differing from the first angle to define variable times, in the directions of the X and Z axes to the exclusion of the Y axis, for the particle to pass through them relative to the time the particle passes through the first detector. To determine the position and/or velocity vectors, the time displacement between the pulses derived from the different detectors is measured.

14 Claims, 4 Drawing Figures

MICROMETEOROID VELOCITY AND TRAJECTORY ANALYZER

ORIGIN OF THE INVENTION

The invention described herein was made in ther performance of work under a NASA contract and is subject to the provisions of Section 305 of the National Aeronautics and Space Act of 1958, Public Law 85-568 (72 STAT 435; 42 USC 2457).

FIELD OF THE INVENTION

The present invention relates generally to apparatus for detecting a moving charged particle, and more particularly to an apparatus for detecting the particle in response to voltage pulses induced in grids pervious to the particle.

BACKGROUND OF THE INVENTION prior apparatus for determining the location of a particle moving relative to a detector assembly has frequently employed a metal film which produces a plasma stream in response to impact of the particle on the film. Exemplary of a prior art patent disclosing a device of this type is my U.S. Pat. No. 3,694,655. In the device disclosed in the patent the particle impinges on one of a plurality of parallel film strips which are interconnected with an electrical network to enable the strip on which the particle impacted to be detected.

A disadvantage of the prior art device is that a particle impacting on the film is altered in characteristic while it penetrates and interacts with the film which results in several detrimental effects. In particular, the velocity of the particle impacting on the film is reduced, frequently to zero. The flight direction of the particle tends to be changed, and the mass of any particle that penetrates the film has a tendency to be reduced. A certain amount of the film material tends to be ejected, with a possible ultimate deterioration of the film if it is exposed for long time periods. Because of the interaction between the film and particle, the mineralogical structure of the particle, particularly if it is a very small particle (e.g., cosmic dust or a micrometeoroid) tends to be destroyed. The rotational or spinning frequency of an impacting particle on a metal film tends to be decreased after the particle has penetrated through the film.

Any electrical charge on the particle is almost completely or completely removed as a result of the interaction. Further, since the film is biased, electric energy from the film is frequently transferred to the particle so that a determination of the electric charge of the particle prior to its impact with the film is frequently impossible.

The chemical composition of the particle also tends to be contaminated by the penetration and interaction of the particle with a metal strip because a certain number of atoms from the strip are transferred to the particle and vice versa. The recited disadvantages of the prior art tend to make consecutive analysis of the characteristics of particles, such as micrometeoroids or cosmic dust, relatively difficult and uncertain.

BRIEF DESCRIPTION OF THE INVENTION

The present invention provides a new and improved apparatus for detecting movement of a charged particle through a region. In response to detection of the charge, the apparatus enables the position and/or velocity vectors of a particle having a substantially straight line, constant velocity path relative to the apparatus to be detected. The present application has particular utility in connection with detection of micrometeoroids in interplanetary space which have been shown to carry a positive charge; see the Zodiacal Light and Interplanetary Medium, 1967, NASA SP-150, written by J. W. Rhee. It is desirable to detect such a moving charged particle and determine its position and/or velocity vectors in three mutually orthogonal axes without having the charged particle impact on any elements of a detector, and without having the particle motion changed. The principles of the invention are applicable to detecting and determining the position and/or velocity vectors of any particle having sufficient mass and charge to be detected and which is pervious to a grid array capable of detecting the charge.

The charge is detected as the particle successively passes through a detector including three mutually parallel, planar spaced metal grids pervious to the particle. The two outer grids, on either side of a center grid, are substantially short-circuited together and to ground. The center grid is connected to a single input terminal of a D.C. amplifier, whereby the amplifier derives a pulse having a maximum amplitude commensurate with the charge of the particle as the particle passes through the three grids. The pulse duration extends over the time while the particle is passing through the three parallel grids, rising from a minimum value at the time the particle passes through the first outer grid, reaching a peak value when the particle passes through the center grid, and returning to a minimum, substantially ground level, as the pulse passes through the other outer grid.

The present invention preferably utilizes a single planar grid stretched over the entire area of the detectors as a basic element so that it is easy to manufacture relative to the prior art wherein each electrode includes many individual, electrically isolated strips. The use of a single grid for each element of a detector is advantageous because the single grid requires mechanical support from only one frame, rather than a complicated framework, which is used in the prior art isolated strip electrodes. A simple mechanical support for the entire grid of a detector enables the present invention to provide a considerably higher probability of charged particles, in particular micrometeoroids, being passed through a detector array than is attained with the prior art.

The detectors are arranged, in accordance with the invention, to enable the position and/or velocity vectors of the particle to be detected relative to three mutually orthogonal axes, X, Y and Z. A first pair of the detectors is spaced from each other in mutually parallel planes defined by the X and Y axes, while a second pair of detectors is spaced from each other in mutually parallel planes that intersect planes defined by the X and Y axes at a first acute angle to define variable times, in the directions of the Y and Z axes, to the exclusion of the X axis, for the particle to pass through them relative to the time the particle passed through a first detector of the first pair. A third pair of detectors is spaced from each other in mutually parallel planes that intersect planes defined by the X and Y axes at a second acute angle differing from the first angle to define variable times, in the directions of the X and Z axes, to the exclusion of the Y axis, for the particle to pass through them relative to the time the particle passed through the first detector. By detecting the relative times at which the particle passes through each of the detectors it is possible to determine the position and/or velocity vectors of the particle as it moves through the array by utilizing geometric principles and by knowing the dimensions and separations of the various detectors.

Greater instrument reliability is attained with an electronic network, including the many capacitors and resistors that are used in the prior art. A further advantage of the invention, concerning instrumentation, is that time intervals can be measured with greater precision, and with apparatus that is easier to implement than analog voltages or pulse height ratios, as in the prior art. Further, since the charge of the particle is repeatedly measured as it passes unaltered through as many as six independent pulse height measuring detectors, greater accuracy of the value of the particle charge can be obtained.

If desired, the apparatus can be utilized for determining the position and/or velocity vectors of the particle in only a pair of mutually orthogonal axis, by eliminating one pair of the detectors. Also, if it is desired to enable only the position, and not the velocity vectors, of the particle to be detected in three orthogonal directions, a pair of parallel detectors is provided, between which are positioned third and fourth detectors that make different acute angles to planes parallel to the pair of detectors. If it is desired to enable the position of the particle to be detected in only a pair of mutual orthogonal axes, there is provided a pair of parallel detectors between which is positioned a further detector that is at an acute angle to the planes of the pair of detectors.

It is, accordingly, an object of the present invention to provide a new and improved apparatus for detecting the movement of a charged particle through a region without affecting the chemical, electrical or dynamic characteristics of the particle.

Another object of the invention is to provide a new and improved apparatus for enabling the position and/or velocity vectors of a charged particle to be detected in at least a pair of mutually orthogonal axes.

An additional object of the invention is to provide apparatus for detecting the position and/or velocity vectors of a charged particle wherein the particle passes through detectors that are pervious to it.

A further object of the invention is to provide an apparatus for enabling the position and/or velocity vectors of a charged particle to be detected in at least a pair of mutually orthogonal axes wherein the particle passes through a series of detectors that do not alter the charge of the particle.

Another object of the invention is to provide a new and improved apparatus for enabling the position and/or velocity vectors of a charged particle to be detected wherein the velocity, charge, flight direction, mass, rotational frequency and chemical composition of the particle are not altered by the detecting apparatus.

A further object of the invention is to provide a new and improved apparatus for enabling the position and/or velocity vectors of a charged particle to be detected wherein the detector structure is not subject to degradation as a result of detection.

Yet another object of the invention is to provide a new and improved apparatus for detecting the position and/or velocity vectors of a charged particle wherein there is a relatively low probability of the particle striking any mechanical supporting structure.

An additional object of the invention is to provide a new and improved charged particle velocity vector and/or position detector utilizing relatively simple and accurate circuitry.

The above and still further objects, features and advantages of the present invention will become apparent upon consideration of the following detailed description of one specific embodiment thereof, especially when taken in conjunction with the accompanying drawing.

DETAILED DESCRIPTION OF THE DRAWING

Figures 1, 2:
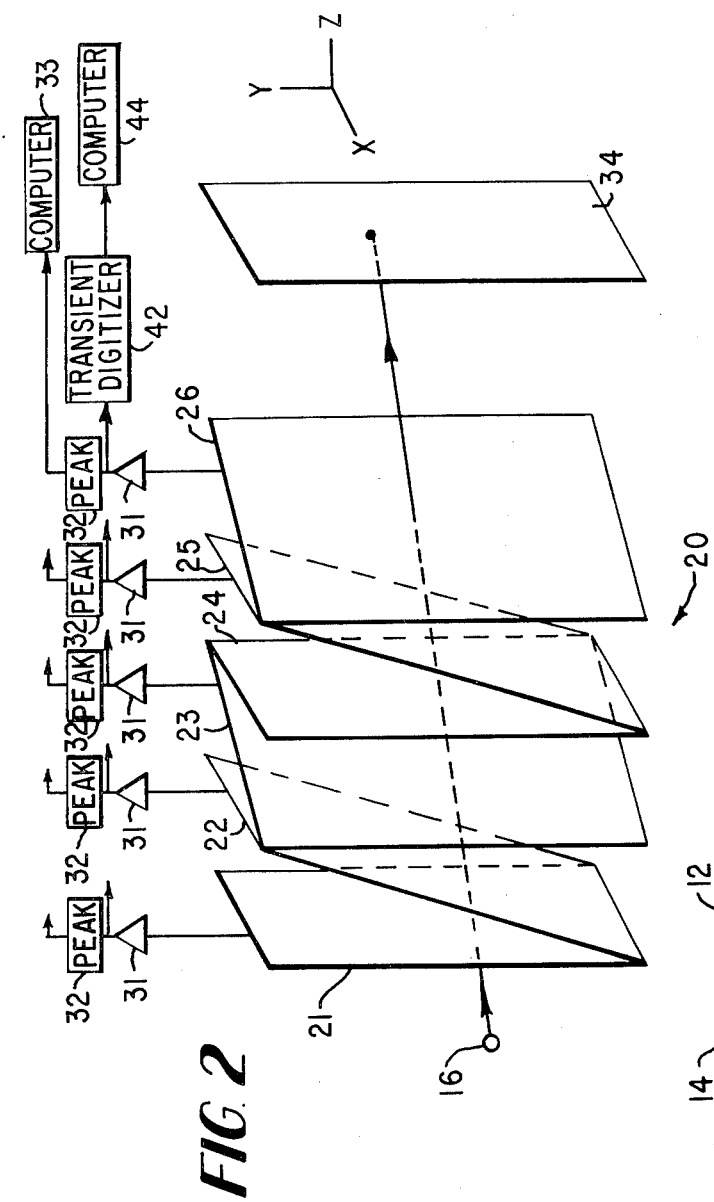
FIG. 1 is a side-sectional view of a preferred detector utilized with the invention.
FIG. 2 is a perspective view of a detector array for enabling the position and/or velocity vectors of a charged particle to be detected in three mutually orthogonal axes.

Reference is now made to FIG. 1 of the drawing wherein there is illustrated a side-sectional view of an electric charge detector that includes three equally spaced, mutually parallel, metal grids 11, 12 and 13 through which a charged particle, such as an outer space micrometeoroid, passes in a straight line trajectory at constant velocity. Outer grids 11 and 13 are short-circuited to each other by grounded lead 14, whereby grids 11 and 13 define equi-potential, ground planes. Center grid 12, between outer grids 11 and 13, is connected in a D.C. circuit to a signal input terminal of high input impedance, D.C. operational amplifier 15 that has a reference terminal connected to ground. Grids 11–13 have a mesh structure and are supported by a single framework (not shown) such that the probability of a micrometeoroid 16 impacting on any of the grids is substantially zero. Wires included in grids 11–13, however, are sufficiently close to each other to enable a charge to be induced in the grids as the micrometeoroid 16 passes through the detector formed by grids 11–13. There is no voltage from an external D.C. source connected to grids 11–13 so that passage of the particle through the grids has no substantial effect on the electrical, chemical or dynamic properties of the particle.

Grids 11–13 inherently have a stray, relatively constant capacitance between them, as represented in FIG. 1 by the dotted line capacitor 17 connected between the input signal terminal of amplifier 15 and ground. To enable detection of particles having extremely small charge, as low as approximately $10^{-16}$ Coulomb, amplifier 15 preferably includes a low-noise, low-capacitance field effect transistor input stage that is operated at a relatively low temperature, on the order of $-30°$ Celsius or less. As positively charged micrometeoroid 16 passes through the detector, the output voltage of amplifier 15 increases from a zero level to a maximum when the micrometeoroid passes through the plane of grid 12. The output voltage of amplifier 15 returns to zero potential when the micrometeoroid passes through the plane of grid 13, as shown by waveform 18, which represents the voltage versus time output of amplifier 15 as the micrometeoroid passes through grids 11–13; the output of the amplifier at the different times while micrometeoroid 16 is passing through the grids is represented by a projection of the space between the grids onto waveform 18.

Grids 11–13 together form a single planar detector. Six of these detectors 21–26 are combined to form an array 20 for enabling the position and velocity vectors of micrometeoroid 16 to be detected in three mutually orthogonal axes, X, Y and Z, as illustrated in FIg. 2. Detectors 21–26 are electrically insulated from each other and positioned to be in a line of flight of micrometeoroid particle 16 so that the micrometeoroid passes through the detectors in the numbered sequence, viz: the micrometeoroid passes through detectors 21, 22, 23, 24, 25 and 26 in sequence as named.

A Cartesian coordinate system for detector array 20 is assumed whereby the longitudinal axis of the array is along a Z axis, a first, horizontally directed axis transverse to the Z axis is defined as the X axis and a second vertically extending axis transverse to the Z axis is the Y axis. Array 20 is arranged so that detectors 21 and 24 lie in mutually parallel planes defined by or coincident with the X and Y axes. Detectors 22 and 25 are spaced from each other in mutually parallel planes that intersect planes 21 and 24 at a first acute angle such that particle 16 passes through planes 22 and 25 relative to the time it passes through the plane of detector 21 at variable times which indicate the point in the plane of detectors 22 and 25 through which the particle passes. The angle of detectors 22 and 25, however, is such that they provide no X axis information of the particle location. Detectors 23 and 26 are spaced from each other in mutually parallel planes that intersect the planes of detectors 21 and 24 at a second acute angle differing from the angle which detectors 22 and 25 intersect the planes of detectors 21 and 24. Thereby, variable times are defined for particle 16 to pass through detectors 23 and 26 relative to the time the particle passes through detector 21 to enable the position of the particle in the X and Z axes to be determined. However, detectors 23 and 26 provide no information relative to the location of the micrometeoroid in the Y axis.

To enable the locations in the X, Y and Z axes of micrometeoroid 16 to be determined, i.e., the micrometeoroid trajectory through array 22, from the relative times which the micrometeoroid passes through detectors 21–26 is detected and the relative spacing and size of the detectors must be known. Preferably, the geometry and spacing of detectors 21–26 are such that each of them has a rectangular projection of the same area in the X-Y plane, and detectors 22, 23, 25 and 26 are projected as rectangles of equal area on the Y-Z plane. These results are achieved by positioning detectors 21 and 24 a predetermined distance, $D_z$, from each other and by positioning planes 22 and 23 such that the rectangular projections thereof into the Y-Z plane bisect the distance between detectors 21 and 24, i.e., the projection of each of detectors 22 and 23 in the Y-Z plane is represented by the distance $D_z/2$; these two projections have almost abutting, adjacent parallel edges. There are similar projections of detectors 25 and 26 into the Y-Z plane.

To these ends, detectors 21, 22, 24 and 25 have lower, straight adjacent edges that extend along a common line. Detectors 23 and 24 include the vertically extending, adjacent, straight, mutually parallel edges on the right sides thereof. The upper left corners of detectors 22 and 23, as well as the upper left corners of detectors 25 and 26 are adjacent each other.

To enable the position and/or velocity vectors of micrometeoroid 16 to be detected in the X, Y and Z axes, and to detect the charge thereof, each of detectors 21–26 derives a separate output pulse as the micrometeoroid passes through it. The pulse is detected as described supra with regard to FIG. 1, by connecting a different amplifier 31 to be responsive to the voltage induced in each of detectors 21–26 as the micrometeoroid passes through it; in the alternative the pulses derived from the different detectors can be coupled through a separate isolating resistor to a single amplifier.

To enable the charge of micrometeoroid 16 to be detected, the output signal of each of amplifiers 31 is applied to a separate peak detector network 32. The output signals of sample and hold networks 32 are supplied to analog computer divider network 33, which is operative after particle 16 has passed through detector 26 to divide the sum of all of the detected peaks by a predetermined constant, equal to the number of detectors, thereby to provide an indication of the charge of the micrometeoroid after it has passed through the six cascaded detectors 21–26.

After micrometeoroid 16 has passed through detectors 21–26, it may be desirable for it to impinge on a target 34 for further analyzation purposes. To this end, target 34 is provided downstream of array 20 and is positioned in the X-Y plane.

The output signals of amplifiers 31 are applied to circuitry for detecting the relative occurrence times of the pulses derived from detectors 22–26 relative to the time a pulse is derived from detector 21. A typical apparatus for detecting the relative occurrence times is a transient digitizer 42, such as available from Tektronix (Model R7912). Transient digitizer 42 derives a digital output signal indicative of the times which micrometeoroid 16 passes through the planes defined by detectors 22–26 relative to the time the micrometeoroid passes through the plane defined by detector 21. The output signal of digitizer 42 is supplied directly to computer 44, or signals from the digitizer can be coupled to the computer via an RF transmission link.

Computer 44 includes conventional circuitry for solving sets of equations which enable the trajectory, i.e., locations, and velocity vectors, to be determined in the three orthogonal directions. In particular, as illustrated in FIG. 3, the velocity component of particle 16 along the Z axis, $V_z$, is determined in response to the time difference of pulses derived from detectors 21 and 24, $t_z$, and the known distance between detectors 21 and 24, $D_z$, in accordance with;

$$v_z = \frac{D_z}{t_z} \qquad (1)$$

Figure 3:
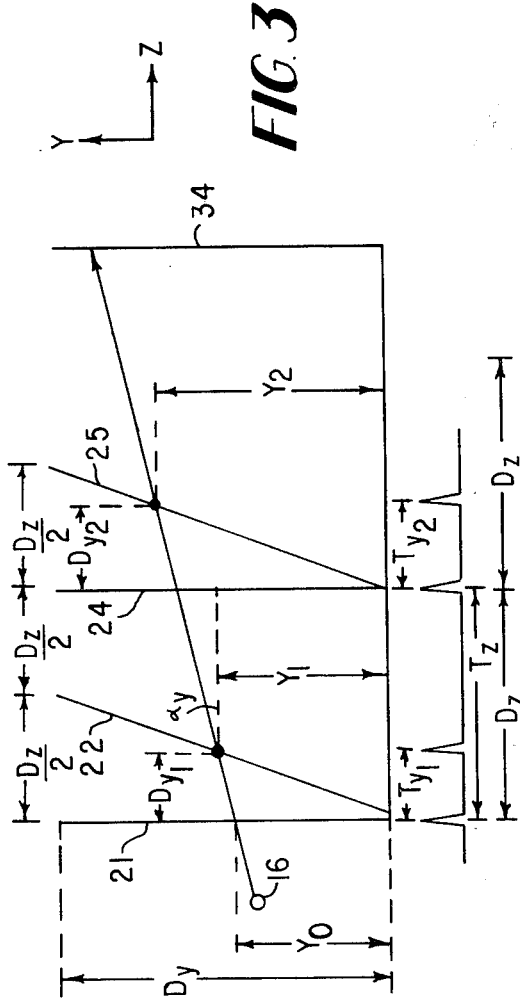
FIG. 3 is a view illustrating the geometrical and time relations in one plane of the apparatus illustrated in FIG. 2.

The $y_1$ and $D_{y_1}$ coordinates (in the Y and Z directions, respectively) of the point that the micrometeoroid passes through detector 22, for the particular geometry given in connection with FIG. 3, are determined from the relative times required for the micrometeoroid to pass between detectors 21 and 24, as well as between detectors 21 and 22 ($t_{y_1}$) and from the separation of detectors 21 and 22 ($D_z/2$), as:

$$D_{v_1} = \frac{D_z t_v}{t_z} \qquad (2)$$

$$y_1 = \frac{2D_y t_{v2}}{t_z} \qquad (3)$$

where $D_y$ is the length of detector 21 along the Y axis. Similarly, the point that micrometeoroid 16 passes through detector 25, parallel to detector 22, is determined from the time separations ($t_{v_1}$ and $t_{v_2}$) of pulses derived from detectors 21, 24 and 25 in accordance with:

$$D_{v_2} = \frac{D_z t_{v2}}{t_z} \qquad (4)$$

$$y_2 = \frac{2D_y t_{v2}}{t_z} \qquad (5)$$

After having determined the coordinates for the positions of micrometeoroid 16 when it passed through detectors 22 and 25, the velocity direction in the Y-Z plane is determined as angle $\alpha_y$ in accordance with:

$$\tan \alpha_y = \frac{y_2 - y_1}{D_z + D_{v_2} - D_{v_1}} \qquad (6)$$

which can be rewritten as:

$$\tan \alpha_y = 2 \frac{D_y}{D_x} \left( \frac{t_{v2} - t_{v1}}{t_z + t_{v_2} - t_{v_1}} \right) \qquad (7)$$

The Y axis coordinate along a point at any distance Z from plane 21 is given by:

$$y(z) = z \tan\alpha_y + y_o \qquad (8)$$

where:
$y_o$ is the point which the micrometeoroid passes through detector 21 along the Y axis. Equation (8) can be written as:

$$y_o = y_1 - D_{v_1} \tan\alpha_y \qquad (9)$$

Equation (9) can be written as:

$$y_o = (2D_y - d_z \tan \alpha_y) \frac{t_{v1}}{t_z} \qquad (10)$$

Substituting Equation (10) into Equation (8) yields the following relationship for the Y axis position of micrometeoroid 16 relative to the Z axis:

$$y(z) = z \tan \alpha_y + (2D_y - D_z \tan \alpha_y) \frac{t_{v1}}{t_z} \qquad (11)$$

The velocity of micrometeoroid 16 in the Y direction is given by detecting the time differential of pulses derived from electrodes 22 and 25 and from the difference of the points on the Y axis through which the micrometeoroid passes in detectors 22 and 25 as:

$$v_y = \frac{y_1 - y_2}{t_z + t_{v_2} - t_{v_1}} \qquad (12)$$

Figure 4:
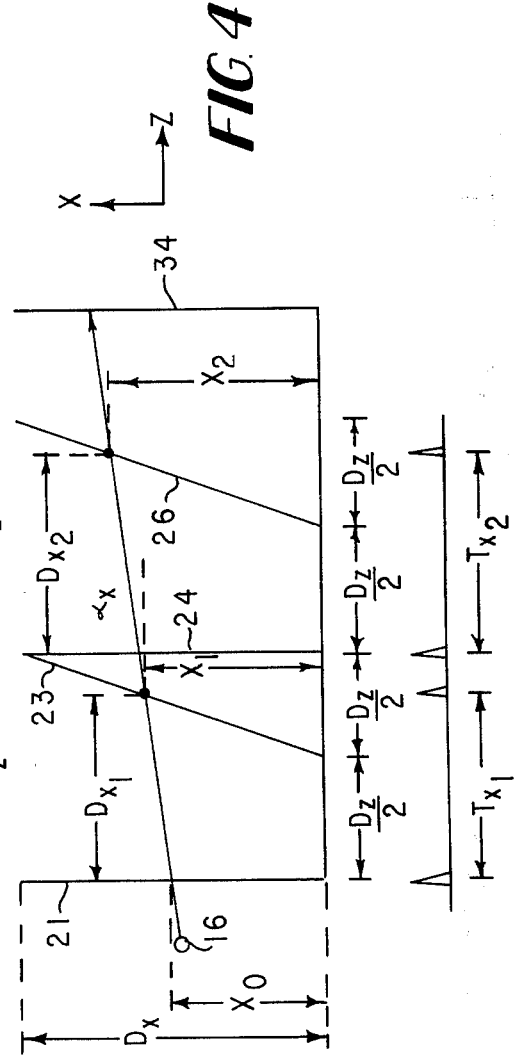
FIG. 4 is a view illustrating geometrical and time relations in a plane orthogonal to the plane of FIG. 3.

A similar relationship exists for the X-Z plane as illustrated in FIG. 4 wherein the electrodes 21, 23, 24 and 26 are utilized to detect the velocity component in the X axis and the angle of the micrometeoroid in the X-Z plane, and to enable the X position of the particle to be determined at any point along the Z axis. In particular, pulses from electrodes 21, 23, 24 and 26 are utilized to derive time indications of the particle passing these electrodes to enable equations to be solved to establish:

$$D_{x_1} = \frac{D_z t_{x1}}{t_z} \qquad (13)$$

$$x_1 = \frac{2D_x t_{x1}}{t_z} \qquad (14)$$

$$D_{x_2} = \frac{D_z t_{x2}}{t_z} \qquad (15)$$

$$x_2 = \frac{2D_x t_{x2}}{t_z} \qquad (16)$$

where:
$D_x$ = the length of detectors 23 and 26 along the X axis;
$t_{x_1}$ = time required for particle 16 to travel between detectors 21 and 23;
$t_{x_2}$ = time required for particle 16 to travel between detectors 24 and 26;
$D_{x_1}$ = Z axis coordinate location of particle 16 where it passes through detector 23;
$D_{x_2}$ = Z axis coordinate location of particle 16 where it passes through detector 26;
$x_1$ = X axis coordinate location of particle 16 where it passes through detector 23;
$x_2$ = X axis coordinate location of particle 16 where it passes through detector 26;

$$\tan \alpha_x = \frac{x_2 - x_1}{D_z + D_{v_1} - D_{v_2}} \qquad (17)$$

$$= 2 \frac{D_y}{D_z} \left( \frac{t_{v1} - t_{v2}}{t_z + t_{v_2} - t_{v_1}} \right) \qquad (18)$$

where $\alpha_x$ is the velocity direction of particle 16 in the X-Z plane.

$$x(z) = z \tan \alpha_x + x_o \qquad (19)$$

where:
$x_o$ = the coordinate position of particle 16 when it passes detector 21
$= x_1 - D_{x_1} \tan \alpha_x \qquad (20)$ $$= (2D_x - D_z \tan \alpha_x) \frac{t_{x1}}{t_z} \qquad (21);$$

$$x(z) = z \tan \alpha_x + (2D_x - D_z \tan \alpha_x) \frac{t_{x1}}{t_z} \qquad (22).$$

The velocity of particle 16 along the X axis is:

$$v_x = \frac{x_1 - x_2}{t_z - t_{x_2} - t_{x_1}} \qquad (23)$$

It is to be noted that detectors 23 and 26 are not illustrated in FIG. 3 and that detectors 22 and 25 are not illustrated in FIG. 4. This is because in the Y-Z plane detectors 23 and 26 appear as straight lines parallel to the straight lines defining detectors 21 and 24. Therefore, detectors 23 and 26 add no information regarding the particle trajectory in the Y-Z plane. Similarly, in the X-Z plane, detectors 22 and 25 appear as straight lines parallel to the lines defining detectors 21 and 24, whereby detectors 22 and 25 add no information in the X-Z plane.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. Apparatus for enabling the position and/or velocity vectors of a charged particle to be detected in three mutually orthogonal axes, X, Y and Z, said charged particle having a substantially straight line constant velocity path relative to the apparatus, comprising: an array of first, second, third, fourth, fifth and sixth planar detectors pervious to the particle and positioned to be in a line of flight of the particle so that the particle passes through the detectors in the numbered sequence; each of said detectors including means for deriving an output pulse in response to the particle passing through it; said first and fourth detectors being spaced from each other in mutually parallel planes defined by the X and Y axes; said second and fifth detectors being spaced from each other in mutually parallel planes that intersect planes defined by the X and Y axes at a first acute angle to define variable times, in the directions of the Y and Z axes to the exclusion of the X axis, for the particle to pass through them relative to the time the particle passes through the first detector; said third and sixth detectors being spaced from each other in mutually parallel planes that intersect planes defined by the X and Y axes at a second acute angle differing from the first angle to define variable times, in the directions of the X and Z axes to the exclusion of the Y axis, for the particle to pass through them relative to the time the particle passes through the first detector; and means responsive to the pulses derived from all of the detectors of the array for measuring the time displacement between the pulses derived from the different detectors.

2. Apparatus for enabling the position and/or velocity vectors of a charged particle to be detected in at least a pair of mutually orthogonal axes, X and Z, said charged particle having a substantially straight line path and constant velocity relative to the apparatus, comprising: an array of first, second, third and fourth planar detectors pervious to the particle and positioned to be in a line of flight of the particle so that the particle passes through the detectors in the numbered sequence; each of said detectors including means for deriving an output pulse in response to the particle passing through it; said first and third detectors being spaced from each other in mutually parallel first and second planes orthogonal to the Z axis; said second and fourth detectors being spaced from each other in mutually parallel third and fourth planes that intersect planes parallel to the first and second planes at a first acute angle to define variable times, in the directions of the X and Z axes, for the particle to pass through them relative to the time the particle passes through the first detector; and means responsive to the pulses derived from all of the detectors of the array for measuring the time displacement between the pulses derived from the different detectors.

3. The apparatus of claim 2 wherein each of said detectors includes means for deriving the output pulse without affecting the charge or flight path of the particle.

4. The apparatus of claim 3 wherein each of said detectors comprises first, second and third spaced metal grids pervious to the particle and positioned so that the particle passes through them in the numbered sequence, means for maintaining said first and third grids at substantially the same D.C. voltage and for enabling the second grid to be at a floating voltage relative to the first and third grids, a D.C. amplifier having first and second input terminals, said first input terminal being substantially short circuited to the first and third grids, and D.C. circuit means for connecting said second input terminal to be responsive to a voltage pulse induced in the second grid by the particle passing through the three grids.

5. Apparatus for enabling the position of a charged particle to be detected in a pair of mutually orthogonal axes, X and Z, said charged particle having a substantially straight line path relative to the apparatus, comprising: an array of first, second and third planar detectors pervious to the particle and positioned to be in a line of flight of the particle so that the particle passes through the detectors in the numbered sequence; each of said detectors including means for deriving an output pulse in response to the particle passing through it; said first and third detectors being spaced from each other in mutually parallel first and second planes at right angles to the Z axis; said second detector being in a plane at an acute angle to the first and third detectors to define variable times, in the directions of the X and Z axes, for the particle to pass through it relative to the time the particle passes through the first detector; and means responsive to the pulses derived from all of the detectors of the array for measuring the time displacement between the pulses derived from the different detectors.

6. The apparatus of claim 5 wherein each of said detectors includes means for deriving the output pulse without affecting the charge or flight path of the particle.

7. The apparatus of claim 6 wherein each of said detectors comprises first, second and third spaced metal grids pervious to the particle and positioned so that the particle passes through them in the numbered sequence, means for maintaining said first and third grids at substantially the same D.C. voltage and for enabling the second grid to be at a floating voltage relative to the first and second input terminals, said first input terminal being substantially short circuited to the first and third grids, and D.C. circuit means for connecting said second input terminal to be responsive to a voltage pulse induced in the second grid by the particle passing through the three grids.

8. Apparatus for detecting movement of a charged particle through a region comprising first, second and third spaced metal grids pervious to the particle and positioned so that the particle passes through them in the numbered sequence, means for maintaining said first and third grids at substantially the same D.C. voltage and for enabling the second grid to be at a floating voltage relative to the first and third grids, a D.C. amplifier having first and second input terminals, said first input terminal being substantially short circuited to the first and third grids, and D.C. circuit means for connecting said second input terminal to be responsive to a voltage pulse induced in the second grid by the particle passing through the three grids.

9. The apparatus of claim 8 further including means for detecting the peak amplitude of the voltage pulse.

10. Apparatus for enabling the position of a charged particle to be detected comprising: an array of detectors pervious to the particle and positioned to be in a line of flight of the particle; each of said detectors including means for deriving an output pulse in response to the charge of the particle passing through it; and means responsive to the pulses derived from all of the detectors of the array for deriving a signal enabling the position of the particle as it traverses the array to be determined, said signal deriving means including means for measuring the time displacement between the pulses derived from the different detectors.

11. Apparatus for enabling the position of a charged particle to be detected comprising: an array of detectors pervious to the particle and positioned to be in a line of flight of the particle; each of said detectors including means for deriving an output pulse in response to the charge of the particle passing through it; and means responsive to the pulses derived from all of the detectors of the array for deriving a signal enabling the position of the particle as it traverses the array to be determined, each of the detectors including means for deriving the pulses as variable amplitude pulses having peak values indicative of the charge of the particle as it passes through the detectors, and means responsive to the peak values of pulses derived from a plurality of the detectors for indicating the charge of the particle.

12. The apparatus of claim 11 wherein each of said detectors comprises first, second and third spaced metal grids pervious to the particle and positioned so that the particle passes through them in the numbered sequence, means for maintaining said first and third grids at substantially the same D.C. voltage and for enabling the second grid to be at a floating voltage relative to the first and third grids, a D.C. amplifier having first and second input terminals, said first input terminal being substantially short circuited to the first and third grids, and D.C. circuit means for connecting said second input terminal to be responsive to a voltage pulse induced in the second grid by the particle passing through the three grids.

13. Apparatus for enabling the position of a charged particle to be detected comprising: an array of detectors pervious to the particle and positioned to be in a line of flight of the particle; each of said detectors including an electrode for deriving an output voltage pulse in response to a charge variation induced therein resulting from a charge transfer between the particle and the electrode as the particle passes through the electrode; and means responsive to the pulses derived from all of the detectors of the array for deriving a signal enabling the position of the particle as it traverses the array to be determined.

14. The apparatus of claim 13 wherein each of the electrodes is unbiased.

* * * * *